(12) United States Patent
Patel et al.

(10) Patent No.: US 11,131,491 B1
(45) Date of Patent: Sep. 28, 2021

(54) SYSTEMS AND METHODS FOR MULTI-STAGE OPERATION OF A COMPRESSOR

(71) Applicant: Emerson Climate Technologies, Inc., Sidney, OH (US)

(72) Inventors: Kashmira Patel, Centerville, OH (US); Charles E. Green, Fenton, MO (US); John F. Broker, Warrenton, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 16/987,574

(22) Filed: Aug. 7, 2020

(51) Int. Cl.
*F25B 49/02* (2006.01)
*F25B 31/02* (2006.01)
*F25B 41/20* (2021.01)
*F25B 41/30* (2021.01)

(52) U.S. Cl.
CPC ............ *F25B 49/022* (2013.01); *F25B 31/02* (2013.01); *F25B 41/20* (2021.01); *F25B 41/30* (2021.01); *F25B 49/025* (2013.01); *F25B 2400/077* (2013.01); *F25B 2600/022* (2013.01); *F25B 2600/025* (2013.01); *F25B 2600/05* (2013.01); *F25B 2700/02* (2013.01); *F25B 2700/2104* (2013.01); *F25B 2700/2106* (2013.01)

(58) Field of Classification Search
CPC ...... F25B 49/022; F25B 31/02; F25B 49/025; F25B 2400/077; F25B 2600/022
See application file for complete search history.

(56) References Cited

U.S. PATENT DOCUMENTS

| | | |
|---|---|---|
| 3,842,327 A | 10/1974 | Wexler |
| 4,142,136 A | 2/1979 | Witter |
| 4,151,725 A | 5/1979 | Kountz et al. |
| 4,989,414 A | 2/1991 | Murayama et al. |
| 5,218,283 A | 6/1993 | Wills et al. |
| 5,359,273 A | 10/1994 | Fluckiger |
| 5,490,769 A | 2/1996 | Calhoun |

(Continued)

FOREIGN PATENT DOCUMENTS

| | | |
|---|---|---|
| CN | 101307962 A | 11/2008 |
| CN | 102331073 A | 1/2012 |

(Continued)

*Primary Examiner* — Marc E Norman
*Assistant Examiner* — Schyler S Sanks
(74) *Attorney, Agent, or Firm* — Harness, Dickey & Pierce, P.L.C.

(57) ABSTRACT

A system for controlling a capacity of a compressor includes a motor of the compressor including a main winding connected at a connection point to an auxiliary winding and a drive configured to control a speed of the motor. The system includes a first switch configured to selectively connect the main winding to either a first line voltage or a first output of the drive, a second switch configured to selectively connect the connection point to either a second line voltage or a second output of the drive, and a third switch configured to selectively connect the auxiliary winding to either a capacitor or a third output of the drive. The system includes a solenoid valve configured to selectively either operate in a first capacity or a second capacity. The system includes a control module configured to control the drive, the first switch, the second switch, and the third switch.

14 Claims, 6 Drawing Sheets

(56) References Cited

U.S. PATENT DOCUMENTS

| | | |
|---|---|---|
| 5,861,697 A | 1/1999 | Sugita et al. |
| 6,121,749 A | 9/2000 | Wills et al. |
| 6,172,476 B1 | 1/2001 | Tolbert, Jr. et al. |
| 6,246,207 B1 | 6/2001 | VanSistine et al. |
| 6,412,293 B1 | 7/2002 | Pham et al. |
| 6,568,197 B2 | 5/2003 | Uno et al. |
| 6,570,778 B2 | 5/2003 | Lipo et al. |
| 6,607,367 B2 | 8/2003 | Shibamoto et al. |
| 6,619,062 B1 | 9/2003 | Shibamoto et al. |
| 6,672,846 B2 | 1/2004 | Rajendran et al. |
| 6,801,013 B2 | 10/2004 | Woodward et al. |
| 6,925,823 B2 | 8/2005 | Lifson et al. |
| 6,952,088 B2 | 10/2005 | Woodward et al. |
| 7,015,615 B2 | 3/2006 | Ramu et al. |
| 7,034,422 B2 | 4/2006 | Ramu |
| 7,134,396 B2 | 11/2006 | Ramu |
| 7,201,567 B2 | 4/2007 | Wiertz et al. |
| 7,248,015 B2 | 7/2007 | Byrnes, Jr. et al. |
| 7,271,564 B2 | 9/2007 | Ramu |
| 7,272,302 B2 | 9/2007 | Woodward et al. |
| 7,372,232 B2 | 5/2008 | Ramu |
| 7,412,339 B2 | 8/2008 | Ramu et al. |
| 7,420,308 B2 | 9/2008 | Ramu et al. |
| 7,481,069 B2 | 1/2009 | Lifson et al. |
| 7,793,509 B2 | 9/2010 | Crane |
| 7,852,038 B2 | 12/2010 | Ramu |
| 7,854,137 B2 | 12/2010 | Lifson et al. |
| 7,874,499 B2 | 1/2011 | Lochtefeld |
| 8,079,228 B2 * | 12/2011 | Lifson ............... B60H 1/3216 62/196.3 |
| 8,080,964 B2 | 12/2011 | Hudson et al. |
| 8,203,302 B2 | 6/2012 | Ramu et al. |
| 8,264,182 B2 | 9/2012 | Ramu |
| 8,287,230 B2 | 10/2012 | Hurst, Jr. et al. |
| 8,319,456 B2 | 11/2012 | Ramu |
| 8,525,450 B2 | 9/2013 | Ramu |
| 8,541,920 B2 | 9/2013 | Ramu |
| 8,716,961 B2 | 5/2014 | Ramu |
| 8,756,947 B2 | 6/2014 | Chen et al. |
| 8,901,798 B2 | 12/2014 | Ramu et al. |
| 9,018,882 B2 | 4/2015 | Mack et al. |
| 9,093,942 B2 | 7/2015 | Anderson et al. |
| 9,093,943 B2 | 7/2015 | Ramu |
| 9,115,718 B2 | 8/2015 | Ignatiev et al. |
| 9,599,118 B2 | 3/2017 | Zhou et al. |
| 9,709,311 B2 | 7/2017 | Popli et al. |
| 9,800,188 B2 | 10/2017 | Chretien et al. |
| 9,806,660 B1 * | 10/2017 | Chretien ............... H02P 27/16 |
| 9,935,576 B1 | 4/2018 | Chretien et al. |
| 9,979,328 B1 | 5/2018 | Chretien et al. |
| 10,075,118 B2 | 9/2018 | Chretien et al. |
| 10,203,141 B1 | 2/2019 | Chretien et al. |
| 2004/0089190 A1 | 5/2004 | Ramu et al. |
| 2005/0154545 A1 | 7/2005 | Ramu et al. |
| 2006/0225445 A1 | 10/2006 | Lifson et al. |
| 2007/0199338 A1 * | 8/2007 | Evans ............... B60H 1/3213 62/228.4 |
| 2008/0223057 A1 | 9/2008 | Lifson et al. |
| 2008/0260541 A1 | 10/2008 | Lifson et al. |
| 2008/0307813 A1 * | 12/2008 | Lifson ............... F25B 49/022 62/228.4 |
| 2009/0308086 A1 | 12/2009 | Lifson et al. |
| 2010/0236264 A1 | 9/2010 | Lifson et al. |
| 2011/0048042 A1 | 3/2011 | Chen et al. |
| 2012/0167602 A1 | 7/2012 | Taras et al. |
| 2014/0084816 A1 | 3/2014 | Ramu |
| 2014/0144165 A1 | 5/2014 | Flynn et al. |
| 2014/0151015 A1 | 6/2014 | Sun et al. |
| 2015/0300713 A1 | 10/2015 | Sun et al. |
| 2015/0372543 A1 | 12/2015 | Lobo et al. |
| 2017/0043645 A1 | 2/2017 | He et al. |
| 2017/0077857 A1 | 3/2017 | Chretien et al. |
| 2017/0077859 A1 | 3/2017 | Chretien et al. |
| 2017/0211855 A1 | 7/2017 | Fraser et al. |
| 2019/0170404 A1 | 6/2019 | Chretien et al. |

FOREIGN PATENT DOCUMENTS

| | | |
|---|---|---|
| CN | 102338444 A | 2/2012 |
| CN | 102345915 A | 2/2012 |
| CN | 202597148 U | 12/2012 |
| CN | 202673731 U | 1/2013 |
| CN | 103322715 A | 9/2013 |
| CN | 103322718 A | 9/2013 |
| CN | 103335437 A | 10/2013 |
| CN | 103335440 A | 10/2013 |
| CN | 203533949 U | 4/2014 |
| CN | 104930738 A | 9/2015 |
| CN | 204787380 U | 11/2015 |
| CN | 204985009 U | 1/2016 |
| CN | 105927540 A | 9/2016 |
| EP | 1404540 A2 | 4/2004 |
| EP | 1983275 A1 | 10/2008 |
| JP | 2008267707 A | 11/2008 |
| JP | 04864063 B2 | 1/2012 |
| WO | WO-0187663 A2 | 11/2001 |
| WO | WO-2016201623 A1 | 12/2016 |

* cited by examiner

| Stage | Motor Connection | Y1 | Y2 | S |
|---|---|---|---|---|
| 1 Low | Drive | On | Off | Off |
| 2 Mid | AC Line Power | On | On | Off |
| 3 High | AC Line Power | Off | On | On |
| 4 Off | None | Off | Off | N/A |
| 5 Off | None | Off | Off | N/A |

FIG. 4

SYSTEMS AND METHODS FOR MULTI-STAGE OPERATION OF A COMPRESSOR

FIELD

The present disclosure relates to environmental control systems and more particularly to systems and methods for automatically controlling compressor operation based on a present demand.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, and/or air conditioning) system controls temperature and humidity of a building. Upper and lower temperature limits may be specified by an occupant or owner of the building, such as an employee working in the building or a homeowner.

A compressor of the HVAC system can be a two-stage or variable capacity compressor. While variable capacity compressors may provide high seasonal energy efficiency ratio (SEER) and energy efficiency ratio (EER) ratings, variable capacity compressors may be originally more costly for an owner. Two-stage compressors have a lower cost but are limited to two run capacities, which may decrease overall efficiency as well as SEER and EER ratings.

SUMMARY

In a feature, a system for controlling a capacity of a compressor is described. The system includes a motor of the compressor including a main winding connected at a connection point to an auxiliary winding and a drive configured to control a speed of the motor. The system includes a first switch configured to selectively connect the main winding to either (a) a first line voltage or (b) a first output of the drive, a second switch configured to selectively connect the connection point to either (a) a second line voltage or (b) a second output of the drive, and a third switch configured to selectively connect the auxiliary winding to either (a) a capacitor or (b) a third output of the drive. The system includes a solenoid valve configured to selectively either operate in (a) a first capacity or (b) a second capacity.

The system includes a control module configured to control the drive, the first switch, the second switch, and the third switch by, in response to receiving a demand in a first state: switching the first switch to connect the main winding to the first output of the drive, switching the second switch to connect the connection point to the second output of the drive, switching the third switch to connect the auxiliary winding to the third output of the drive, and switching the solenoid valve to the first capacity. The control module controls by, in response to receiving the demand in a second state: switching the first switch to connect the main winding to the first line voltage, switching the second switch to connect the connection point to the second line voltage, switching the third switch to connect the auxiliary winding to the capacitor, and switching the solenoid valve to the first capacity.

The control module controls by, in response to receiving the demand in a third state: switching the first switch to connect the main winding to the first line voltage, switching the second switch to connect the connection point to the second line voltage, switching the third switch to connect the auxiliary winding to the capacitor, and switching the solenoid valve to the second capacity.

In further features, the control module, the first switch, the second switch, and the third switch are integrated in a control board. In further features, when the solenoid valve is in the first capacity, the solenoid valve is configured to allow a flow of pressurized gas and, when the solenoid valve is in the second capacity, the solenoid valve is configured to selectively restrict the flow of the pressurized gas. In further features, the compressor is a two-stage compressor.

In further features, the main winding includes a first side and a second side, the auxiliary winding includes a first side and a second side, and the connection point connects the second side of the main winding and the first side of the auxiliary winding.

In further features, the demand is set to the second state in response to a first runtime of the first state exceeding a first runtime threshold and the third state in response to a second runtime of the second state exceeding a second runtime threshold.

In further features, the system includes a thermostat and an outside air temperature sensor. In further features, the thermostat is configured to set the demand based on at least one of (i) an inside air temperature and (ii) an outside air temperature and transmit the demand to the control module. The inside air temperature is determined by the thermostat, and the outside air temperature is received from the outside air temperature sensor.

In further features, the demand is set to, during cooling, the first state when the inside air temperature is above a first threshold and below a second threshold, the second state when the inside air temperature is above the second threshold and below a third threshold, and the third state when the inside air temperature is above the third threshold. In further features, the demand is set to, during heating, the first state when the inside air temperature is below the first threshold and above a fourth threshold, the second state when the inside air temperature is below the fourth threshold and above a fifth threshold, and the third state when the inside air temperature is below the fifth threshold.

In further features, the demand is set to, during cooling, the first state when the outside air temperature is above a first threshold and below a second threshold, the second state when the outside air temperature is above the second threshold and below a third threshold, and the third state when the outside air temperature is above the third threshold. In further features, the demand is set to, during heating, the first state when the outside air temperature is below the first threshold and above a fourth threshold, the second state when the outside air temperature is below the fourth threshold and above a fifth threshold, and the third state when the outside air temperature is below the fifth threshold.

In further features, the system includes a relative humidity sensor. In further features, the thermostat is configured to receive a relative humidity from the relative humidity sensor, set the demand further based on the relative humidity, and transmit the demand to the control module.

In further features, the first line voltage and the second line voltage are received from an incoming AC power line. In further features, the drive is configured to selectively adjust the speed of the motor using pulse width modulation control. In further features, the capacitor includes a first side and a second side. In further features, the first side of the capacitor is connected to the third switch. In further features, the second side of the capacitor is connected to the first line voltage.

In a further feature, a heating, ventilation, and/or air conditioning (HVAC) system includes the system for controlling the capacity of the compressor.

In a further feature, a method for controlling a capacity of a compressor is described. The method includes, in response to a demand indicating a first state: switching, via a control module, a first switch to connect a main winding to a first output of a drive, switching, via the control module, a second switch to connect a connection point to a second output of the drive, switching, via the control module, a third switch to connect an auxiliary winding to third output of the drive, and switching, via the control module, a solenoid valve to a first capacity. In further features, a motor of the compressor includes the main winding connected at the connection point to the auxiliary winding. The drive is configured to control a speed of the motor.

The method includes, in response to the demand indicating a second state: switching, via the control module, the first switch to connect the main winding to a first line voltage, switching, via the control module, the second switch to connect the connection point to a second line voltage, switching, via the control module, the third switch to connect the auxiliary winding to a capacitor, and maintaining, via the control module, the solenoid valve at the first capacity. The method includes, in response to the demand indicating a third state: switching, via the control module, the first switch to connect the main winding to the first line voltage, switching, via the control module, the second switch to connect the connection point to the second line voltage, switching, via the control module, the third switch to connect the auxiliary winding to the capacitor, and switching, via the control module, the solenoid valve to a second capacity.

In further features, the control module, the first switch, the second switch, and the third switch are integrated in a control board. In further features, when the solenoid valve is in the first capacity, the solenoid valve is configured to allow a flow of pressurized gas and, when the solenoid valve is in the second capacity, the solenoid valve is configured to selectively restrict the flow of the pressurized gas. In further features, the compressor is a two-stage compressor.

In further features, the main winding includes a first side and a second side, the auxiliary winding includes a first side and a second side, and the connection point connects the second side of the main winding and the first side of the auxiliary winding.

In further features, the method includes setting, via a thermostat, the demand based on an inside air temperature and an outside air temperature and transmitting, via the thermostat, the demand to the control module. The thermostat determines the inside air temperature, and the thermostat receives the outside air temperature from an outside air temperature sensor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a table including multiple stages and corresponding demand inputs from a thermostat;

In the drawings, reference numbers may be reused to identify similar and/or identical elements.

DETAILED DESCRIPTION

Figure 1:
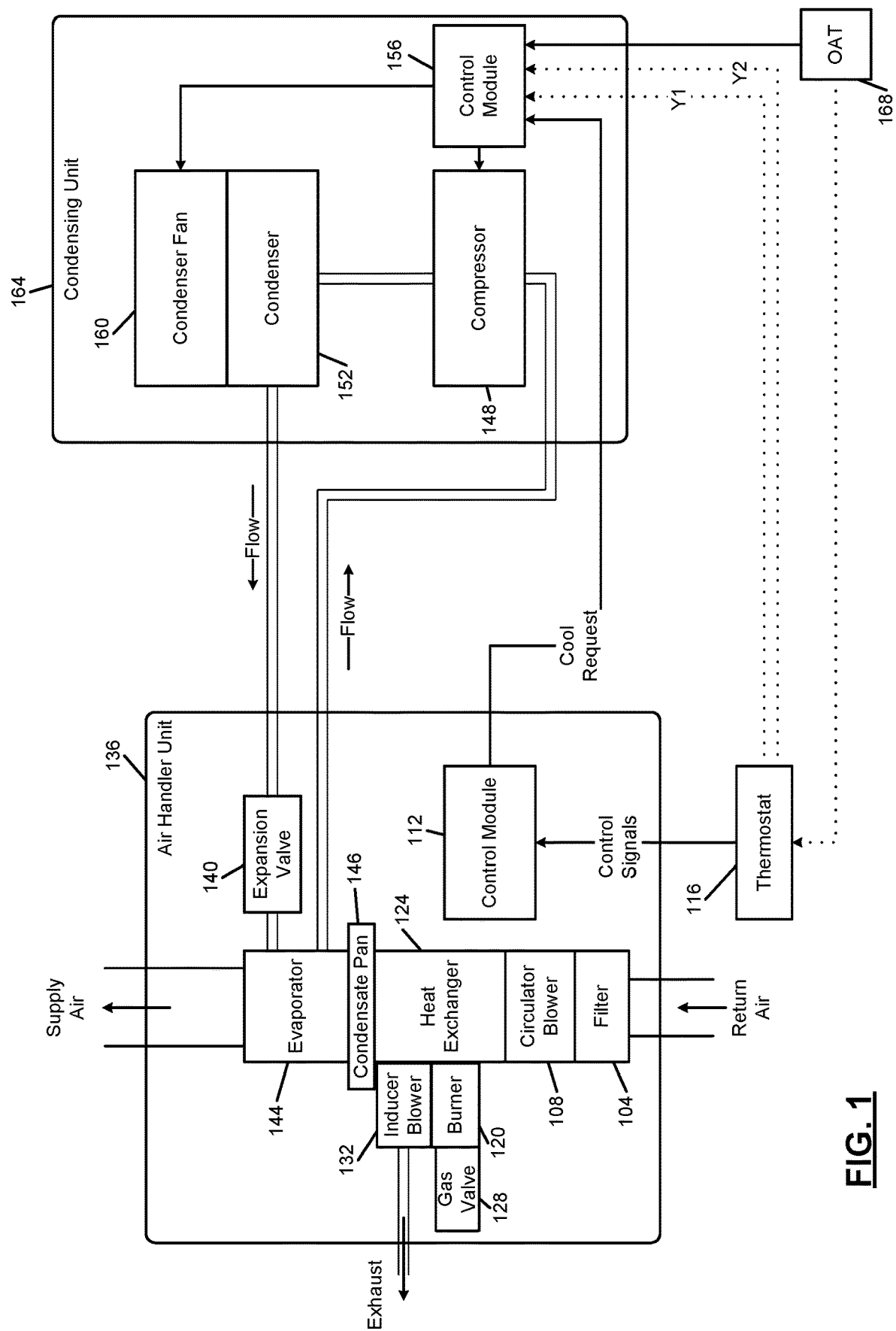
FIG. 1 is a block diagram of an example heating, ventilation, and air conditioning (HVAC) system.

According to the present disclosure, a control module is configured to control a two-stage compressor of a heating, ventilation, and air conditioning (HVAC) system at three capacities or stages instead of only two. The control module controls a set of switches or relays to connect a motor of the compressor to line voltage when operating in a high capacity mode and a mid capacity mode. To operate at different capacities, differentiating the high capacity mode or high stage from the mid capacity mode or mid stage, the control module operates a solenoid valve to turn on during high stage and turn off during mid stage. The solenoid valve is engaged and disengaged (on/off) for mechanical modulation of the two-stage compressor. To operate in a low capacity mode or low stage, the control module connects the motor of the compressor to a drive via the set of switches. The drive is configured to operate the motor of the compressor implementing motor speed control methods. The drive receives power from the same line voltage in order to operate the motor using motor speed control techniques, such as via pulse width modulation (PWM).

To realize high and mid stage operation of the two-stage compressor, the control module connects the motor of the compressor to alternating current (AC) line voltage and controls the solenoid valve of the compressor. For example, to operate in mid stage at partial system load (e.g., approximately 65%) the solenoid valve is disengaged or off (at a first capacity) to allow the flow of pressurized gas return to suction. To operate in high stage at full system load (e.g., 100%) the solenoid valve is engaged or on (at a second capacity) to restrict the flow of pressurized gas back to suction. As indicated, the two stages provide different capacities, the first capacity and the second capacity, at which to run the compressor, for example, based on an indoor setpoint, inside air temperature, an outside air temperature (OAT), a relative humidity, a region or location, a time of day or year, etc. For example, high stage operation, resulting in more cooling, may be more efficient than mid stage during peak heat and humidity, such as during late afternoon in the summer, or in particular regions of the world.

To realize low stage operation using the two-stage compressor, the control module disconnects the AC line voltage from the motor and instead connects the motor to the drive or drive circuit that is configured to operate variable speed control of the motor. The drive may be permanently connected to the AC line voltage for operation. The drive may include a filter, a power factor correction circuit, and an inverter. As is true with mid and high stages, operating at low stage or a lower capacity may be more efficient during a lower OAT and lower humidity time period.

The control module receives a demand signal from a thermostat including demand signals (Y1, Y2, and a solenoid signal S) that indicate which of the three stages of operation to implement the compressor or HVAC system. Additionally or alternatively, the demand signals may exclude the solenoid signal S and instead indicate operating one of the three stages using only two demand signals: Y1 and Y2. The thermostat may be located indoors and includes a temperature sensor. The thermostat may also include a relative humidity sensor. In various implementations, a communication message may be determined and generated by a separate control module included in the HVAC system and transmitted to the control module indicating a demanded stage of operation. For example, the thermostat may determine when to start the compressor based on a difference between a setpoint temperature of the thermostat and an indoor temperature. The thermostat or other control module determines the stage to operate the compressor (or overall HVAC system) based on the various parameters (e.g., inside air temperature, OAT, humidity, etc.). In various implementations, a lookup table may relate indoor air temperatures, OATs, relative humidities, etc. to amounts of time to operate the compressor at a particular stage or a set of stages to reach the setpoint temperature. Additionally or alternatively, the compressor may be controlled to operate at the determined stage until the setpoint temperature is reached, as indicated by a signal from the thermostat instructing the compressor to turn off.

For example, each stage may have an associated threshold at which the stage is engaged. In other words, a stage difference value between the OAT, as sensed by the OAT sensor, and the setpoint temperature may be beyond a high value, warranting the compressor to engage in high stage operation. In various implementations, the stage difference value being beyond the high value as well as the relative humidity being beyond threshold values may prompt the thermostat to generate and transmit a high stage demand to the control module.

If the stage difference value is less than the high value but higher than a mid value, mid stage is activated. If the stage difference value falls between the mid value and a low value, low stage is activated. As mentioned, the humidity in combination with the stage difference value may be used to determine which of the three stages of the compressor to operate. Additional information describing the determination of different run capacities of a compressor are described in U.S. Pat. No. 9,709,311, the disclosure of which is hereby incorporated by reference in its entirety.

The control module controls a motor of a two-stage compressor in a manner that allows the two-stage compressor to operate in three separate stages, two stages operate with the motor directly connected to AC line voltage and a third stage operates with the motor connected to a drive implementing, for example, PWM control. Each stage of operation implements a different capacity of the compressor, providing energy efficiency benefits that not only comply with efficiency regulations but also result in a reduced operating cost. Implementing the two-stage compressor is more cost efficient than a variable capacity compressor but provides higher efficiency and efficacy than standard (only two-stage) operation of a two-stage compressor. The control module operates the two-stage compressor in a manner that provides three separate operating stages, providing a balance between higher efficiency and lower cost.

Block Diagrams

FIG. 1 is a block diagram of an example heating, ventilation, and air conditioning (HVAC) system. In this particular example, a forced air system with a gas furnace is shown. Return air is pulled from a building through a filter 104 by a circulator blower 108. The circulator blower 108, also referred to as a fan, is controlled by a control module 112. The control module 112 receives signals from a thermostat 116. For example, the thermostat 116 may include one or more setpoint temperatures specified by the user. As mentioned previously, the thermostat 116 may include a temperature sensor and a humidity sensor.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may switch one or more switching relays (not shown) to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary (extra) heat to the burner 120.

As shown in FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold (e.g., below the dew point of the air within the building), which causes water vapor to condense. This water vapor is collected in the condensate pan 146, which is drained or is pumped out.

A control module 156 receives a cool request from the control module 112 and controls the compressor 148 accordingly. As is described in more detail in FIGS. 2 and 3, the control module 156 controls a motor and a solenoid valve of the compressor 148 to operate in one of three stages. The control module 156 may also control a condenser fan 160, which increases heat exchange between the condenser 152 and outside air. In such a split system, the compressor 148, the condenser 152, the control module 156, and the condenser fan 160 are generally located outside of the building, often in a single condensing unit 164. As discussed previously, the compressor 148 is a two-stage mechanically modulated scroll compressor. In various implementations, each of the three stages includes corresponding operating stage speeds of the condenser fan 160.

The electrical lines provided to the condensing unit 164 may include a 240 volt mains power line and a 24 volt switched control line. The 24 volt control line may correspond to the cool request shown in FIG. 1. The 24 volt control line controls operation of the control module 156 and solenoid valve (shown in FIGS. 2 and 3). When the control line indicates that the compressor 148 should be on, the control module 156 operates a set of switches to connect the 240 volt power supply to a motor of the compressor 148 or to connect the motor of the compressor 148 to a drive to operate the compressor 148. In addition, the control module 156 may connect the 240 volt power supply to the condenser fan 160.

In various implementations, such as when the condensing unit 164 is located in the ground as part of a geothermal system, the condenser fan 160 may be omitted. The 240 volt mains power supply arrives in two legs, as is common in the U.S., both of the legs connect to the motor of the compressor 148. In various implementations, the control module 156 may be configured to selectively control a motor of the condenser fan 160 at variable speeds.

When in a heating (heat) mode, the thermostat 116 generates a heat request when the temperature measured by the temperature sensor is less than a lower temperature limit. When in a cooling (cool) mode, the thermostat 116 generates a cool request when the temperature measured by the temperature sensor is greater than an upper temperature limit. The upper and lower temperature limits may be set to a setpoint temperature + and − a threshold amount (e.g., 1, 2, 3, 4, 5 degrees Fahrenheit), respectively. The setpoint temperature may be set to a temperature by default and may be adjusted via receipt of user input. The threshold amount may be set by default and may be adjusted via receipt of user input.

In various implementations, the control module 156 or thermostat 116, may receive signals from an OAT sensor 168. To determine a stage (high, mid, or low) at which to operate the compressor 148, as dictated by operation stage of the motor and the solenoid valve, the indoor temperature and setpoint temperature of the thermostat 116 may be compared to determine a stage difference value. For example, the stage difference may be set based on or equal to a difference between the indoor temperature and the setpoint temperature. In various implementations, based on where the stage difference value falls within a set of thresholds (a low value, mid value, and high value corresponding to stages), along with the OAT, relative humidity, region/location, and/or time of day/year, the thermostat 116 may determine which of the three stages to operate the compressor 148. In various implementations, the control module 112 may receive the various parameters to determine the stage of the compressor 148 and include a low stage, mid stage, or high stage demand with the cool request.

In various implementations, if the thermostat 116 is determining the stage, the thermostat 116 may optionally forward (e.g., discrete) demand signals Y1, Y2, and S (indicating solenoid valve position) to the control module 156. The combination of the demand signals Y1, Y2, and S correspond to one of the three stages. Based on the demand signals Y1, Y2, and S, the control module 156 controls the operation of the compressor 148. The thermostat 116 may be a WiFi thermostat having networking capability.

In various implementations, the air handler unit 136 may include a transformer (not shown) connected to an incoming AC power line in order to provide AC power to the control module 112 and the thermostat 116. For example, the transformer may be a 10-to-1 transformer and therefore provide either a 12V or 24V AC supply depending on whether the air handler unit 136 is operating on nominal 120 volt or nominal 240 volt power. Additionally or alternatively, the transformer may be a 5-to-1 transformer to provide 24V AC supply if the air handler is operating on nominal 120 volt power.

The control module 112 controls operation in response to signals from the thermostat 116 received over control lines. The control lines may include a call for cool (cool request), a call for heat (heat request), and a call for fan (fan request). The cool and heat requests are sent to the condensing unit 164 and include a stage request identifying one of the three stages for compressor operation. The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

In various implementations, the OAT sensor 168 may be located within an enclosure, shielded from direct sunlight, and/or exposed to an air cavity that is not directly heated by sunlight. Alternatively or additionally, online (including Internet-based via the thermostat 116) weather data based on the geographical location of the building may be used to determine sun load, OAT, relative humidity, particulate, VOCs, carbon dioxide, etc.

Figure 2:
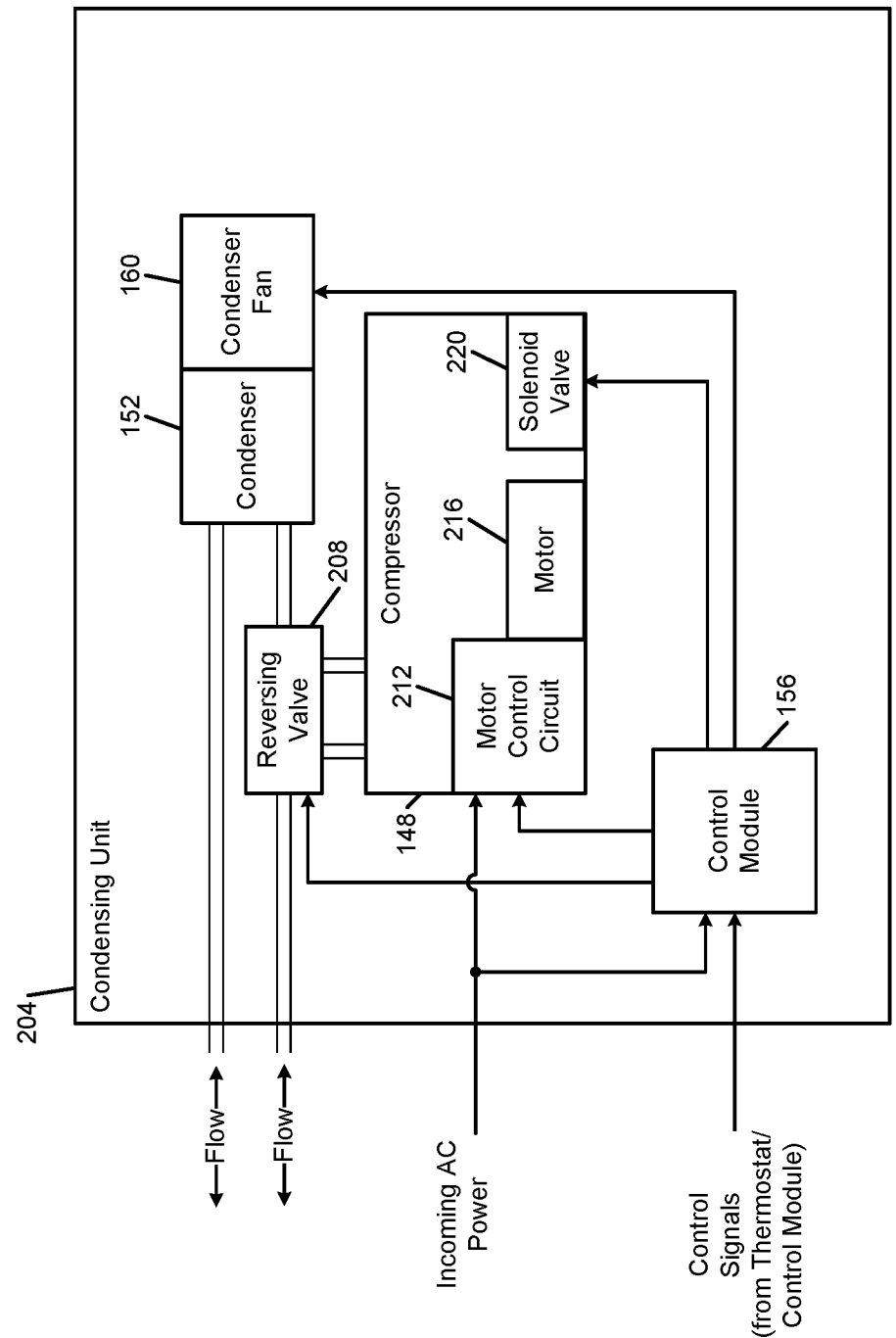
FIG. 2 is a functional block diagram of an example condensing unit of an example HVAC system.

FIG. 2 is a functional block diagram of an example condensing unit 204 of an example HVAC system. The condensing unit 204 may be configured similarly to the condensing unit 164 of FIG. 1. Although referred to as the condensing unit 204, the mode of a heat pump determines whether the condenser 152 of the condensing unit 204 is actually operating as a condenser or as an evaporator. A reversing valve 208 is controlled by the control module 156 and determines whether the compressor 148 discharges compressed refrigerant toward the condenser 152 (cooling mode) or away from the condenser 152 (heating mode). The control module 156 controls the reversing valve 208 and the compressor 148 based on the control signals. The control module 156 may receive power, for example, from a transformer (not shown) of the air handler unit 136 or via the incoming AC power line.

The compressor 148 includes motor control circuit 212, a motor 216, and a solenoid valve 220. The motor control circuit 212 includes elements, such as a set of switches or relays and a drive (shown in FIG. 3). The motor 216 may operate at, for example, approximately 40 hertz (Hz) in low stage and approximately 50-60 Hz in mid and high stage. The control module 156 receives control signals from, for example, the thermostat 116 or the control module 112 of the air handler unit 136. The control signals include demand signals indicating a stage for operation of the compressor 148. As described previously, the control signals may include demand signals Y1, Y2, and S from the thermostat 116. The control module 156 controls the elements of the motor control circuit 212 according to the control signals. For example, if the control signals indicate that the compressor 148 should operate in a low stage, the control module 156 controls switches of the motor control circuit 212 to connect the motor 216 to a drive 332, using the motor speed control to operate the motor 216. While depicted as separate, the control module 156, including the stage control module 304 and the drive control module 308, is integrated into a single controller including the motor circuit 212 as well as the drive 332.

If the control signals indicate the compressor 148 should operate in mid stage or high stage, the control module 156 first operates the motor 216 in low stage, connecting the motor 216 to the drive 332 using the set of switches and switches the motor 216, via the set of switches, to connect directly to the incoming AC power or the AC line voltage. In various implementations, the compressor 148 may be configured to directly operate in mid stage or high stage. Additionally, if the control signals indicate the compressor 148 should operate in mid stage, the control module 156 disengages the solenoid valve 220 so the compressor 148 operates at partial or 65% capacity. The solenoid valve 220 is disengaged when the solenoid valve 220 is off and de-energized. In an example implementation, when the solenoid valve 220 is off, pressurized gas passes through the solenoid valve 220 allowing an amount of the pressurized gas to return to suction of the compressor 148; however, any two-stage compressor can implement the present motor control system and method. In various implementations, the control module 156 may directly connect the motor 216 to the incoming AC power based on the control signals.

If the control signals indicate the compressor 148 should operate in high stage, the control module 156 engages the solenoid valve 220 so the compressor 148 operates at approximately full or 100% capacity. The solenoid valve 220 is engaged when the solenoid valve 220 is on and energized. When the solenoid valve 220 is on, the pressurized gas is restricted and the solenoid valve 220 prevents the gas from passing, thereby preventing the gas back to suction. As an example, due to the pressurized gas being trapped in high stage, a modulation ring of the compressor 148 is moved onto the stationary scroll of the compressor 148 to engage the compressor 148 into full capacity operation by blocking any bypass ports.

In various implementations, the solenoid valve 220 may operate using different or reversed logic. For example, the solenoid valve 220 may be designed such that when the solenoid valve 220 is on or engaged, the on indicates operating at partial capacity. Therefore, the solenoid valve 220 may be on during low stage and mid stage, operating at partial or low capacity.

Figure 3:
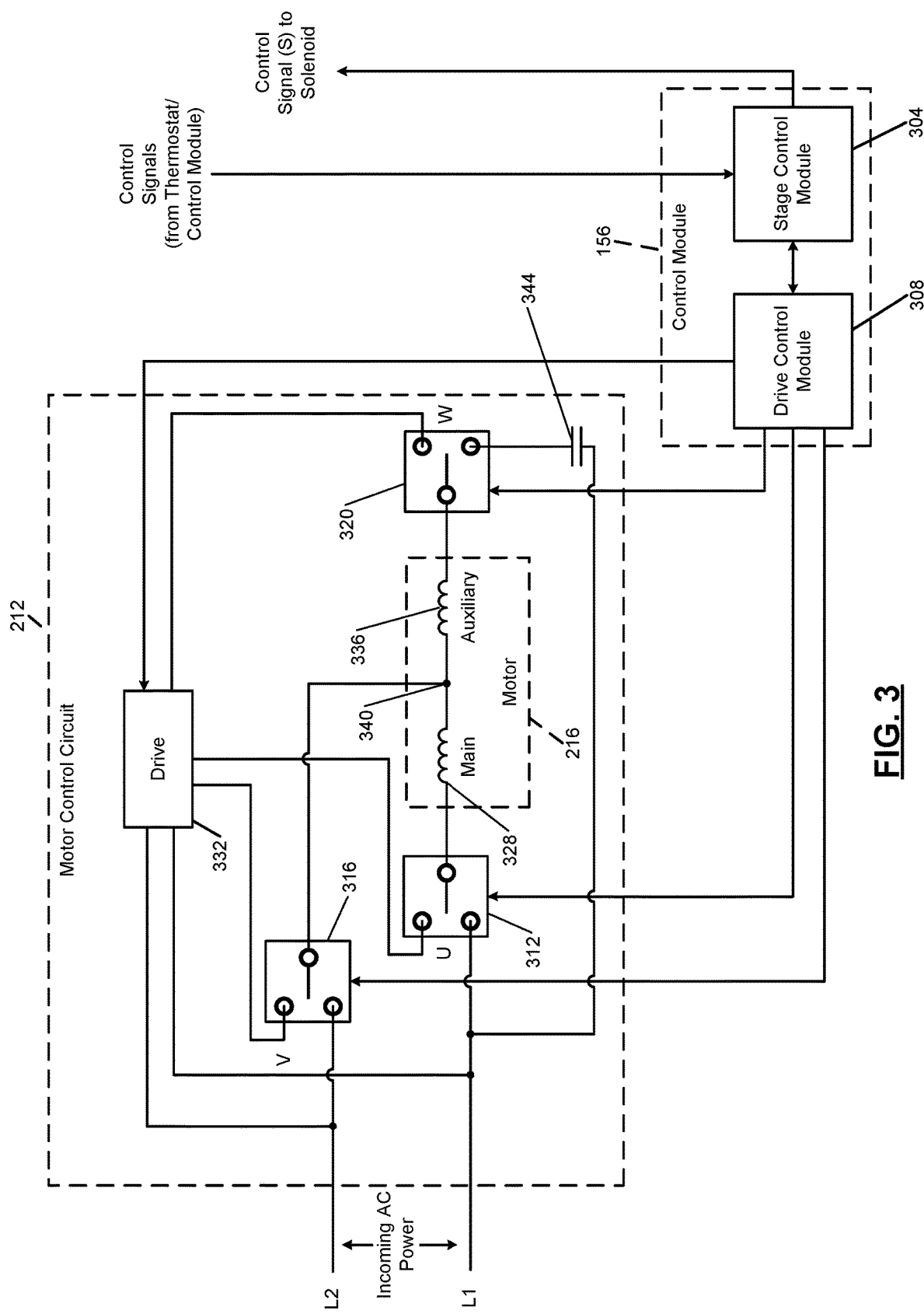
FIG. 3 is a functional block diagram of example motor control circuit of an example compressor of an HVAC system.

FIG. 3 is a functional block diagram of example motor control circuit 212 of an example compressor 148 of an HVAC system. The control module 156 includes a stage control module 304 and a drive control module 308. In various implementations, the stage control module 304 and the drive control module 308 may be incorporated into a signal control module (the control module 156).

The stage control module 304 receives control signals or demand signals from the thermostat or control module of the air handler unit. The control signals indicate at which stage to operate the compressor 148 and, in turn, how to operate the motor 216. As previously discussed, the control signals may be in discrete form as shown in FIG. 4, where demand signals (Y1, Y2, and S) are received from the thermostat indicating how to operate the compressor 148. In various implementations, the thermostat or the control module of the air handler unit may determine the stage at which to run to compressor 148 based on the setpoint temperature of the thermostat, the present indoor temperature, the OAT, the relative humidity, the location/region, the time of day/year, or any combination thereof.

The control module of the air handler unit and the control module 156 may communicate, for example, using RS485 MODBUS or another suitable type of communication including, but not limited to, controller area network (CAN) bus or analog signaling (e.g., 0-10 V signals). If the control signals are in the form of discrete demand signals Y1 and Y2, the signals may be in the range of 5 volt alternating current/direct current (VAC/DC)-30 VAC/DC.

In various implementations, the control module 156 also operates the condenser fan 160 at varying stages corresponding to the stage of the compressor 148. Similarly, the control module 112 of the air handler unit 136 may control various elements of the air handler unit 136 based on the stage of the compressor 148. The stage control module 304 actuates the solenoid valve 220 (shown in FIG. 2) based on the received control signals. For example, the stage control module 304 turns the solenoid valve 220 on if the received control signals request high stage operation. Otherwise, the stage control module 304 may turn the solenoid valve 220 off. More specifically, the stage control module 304, in response to receiving control signals indicating mid stage or high stage operation, will start the motor 216 in low stage. If the motor 216 is already in low stage and the control signals indicate mid stage or high stage operation the stage control module 304 will first instruct the drive control module 308 to connect the motor 216 directly to the incoming AC power (via the set of switches discussed below). Once connected to the incoming AC power, the solenoid valve 220 is turned on.

The drive control module 308 receives the control signals via the stage control module 304. In various implementations, the drive control module 308 may receive the control signals independently. The drive control module 308 controls switching of a set of switches or relays included in the motor control circuit 212. The set of switches includes a first switch 312, a second switch 316, and a third switch 320. The first switch 312 selectively connects a first end of a main winding 328 of the motor 216 to a first line voltage L1 of the incoming AC power or a first output U of the drive 332.

A second end of the main winding 328 connects to a first end of an auxiliary winding 336 of the motor 216 and the second switch 316 at a connection point 340. The second switch 316 selectively connects the connection point 340 to a second line voltage L2 of the incoming AC power or a second output V of the drive 332. The third switch 320 selectively connects a second end of the auxiliary winding 336 to a start capacitor 344 or a third output W of the drive 332. The drive control module 308 controls the first switch 312, the second switch 316, and the third switch 320 based on the received control signals indicating low stage, mid stage, or high stage operation. The drive 332 may be always connected to the incoming AC power lines L1 and L2.

The drive control module 308 controls the set of switches based on the stage indicated by the control signals from the thermostat. If the thermostat transmits a low stage demand signal to the stage control module 304, then the stage control module 304 turns the solenoid valve 220 off/disengages the solenoid valve 220. The drive control module 308 actuates the drive switch 324 to connect the incoming AC power to the drive 332. The drive control module 308 actuates the first switch 312 to connect the first end of the main winding 328 of the motor 216 to the first output U of the drive 332. The drive control module 308 also actuates the second switch 316 to connect the connection point 340 to the second output V of the drive 332. The drive control module 308 also actuates the third switch 320 to connect the second end of the auxiliary winding 336 to the third output W of the drive 332. In various implementations, the drive control module 308 actuates the first switch 312, the second switch 316, and the third switch 320 according to predetermined times at which to actuate each switch. Additionally, while the first switch 312, the second switch 316, and the third switch 320 are depicted as single pole double throw (SPDT) relays, each switch may be implemented as two separate single pole, single throw (SPST) relays.

In this configuration, during low stage, the motor control circuit 212 operates as a motor speed controller. The drive 332 controls application of the incoming AC power to the motor 216 based on signals from the drive control module 308. For example, the drive 332 may control application of the incoming AC power to the motor 216 based on a compressor speed command from the drive control module 308. Based on the speed command, the drive 332 may generate AC power to three-phase outputs from the incoming AC power and apply the three-phase outputs to the motor 216.

The drive 332 may set one or more characteristics of the three-phase AC power based on the compressor speed command, such as frequency, voltage, and/or current. For example, the drive 332 may be a variable frequency drive (VFD). The drive control module 308 may determine a PWM duty cycle to apply to switches (not shown) of the drive 332 to generate AC power having corresponding characteristics. In various implementations, one or more electromagnetic interference (EMI) filters may be implemented inside the drive 332. The drive control module 308 may set the compressor speed command to a plurality of different possible speeds for variable speed low stage operation of the motor 216 and the compressor 148.

For mid stage, the stage control module 304 actuates the solenoid valve 220 to turn or remain off. For example, if the stage control module 304 receives control signals indicating mid stage operation and the motor 216 of the compressor is off, the stage control module 304 will begin motor operation in low stage and switch to mid stage, maintaining the solenoid valve 220 in the off position. However, if the stage control module 304 is changing from high stage to mid stage operation, the stage control module 304 will actuate the solenoid valve 220 to turn off. The drive control module 308 actuates the first switch 312 to connect the first end of the main winding 328 of the motor 216 to the first line voltage L1. The drive control module 308 actuates the second switch 316 to connect the connection point 340 to the second line voltage L2. The drive control module 308 actuates the third switch 320 to connect the second end of the auxiliary winding 336 to the start capacitor 344. In this way, the motor 216 is configured to operate directly on the incoming AC power.

For high stage, the motor 216 is connected as described for the mid stage, operating directly on the incoming AC power. However, in response to receiving the high stage demand, the stage control module 304 actuates the solenoid valve 220 to turn on and engage, restricting the flow of pressurized gas to force the compressor 148 to operate at full capacity. The motor 216 is shown as having the main winding 328 and the auxiliary winding 336 and is a single phase, three wire, permanent split capacitor (PSC) motor.

In various implementations, the control module 156 may control a two speed PSC condensing fan motor or full variable speed BLDC or PSC condensing fan motor being driven by a motor control circuit similar to the motor control circuit 212 based on the signal from the drive control module 308 or the stage control module 304. That is, the presently disclosed motor control implementation can operate both a compressor 148 and a condensing fan motor, providing an improved efficiency of the HVAC system. For example, the condensing fan 160 will operate low speed for low stage, low or high speed for mid stage, and high speed for high stage in case of 2 stage condensing fan motor. In case of variable speed BLDC or PSC condensing fan motor, the condensing fan 160 can operate at varying speeds based on the demand stages to realize best overall performance of the HVAC system—specifically, to perform most efficiency.

FIG. 4 is a table including multiple stages and corresponding demand inputs from a thermostat. The table of FIG. 4 summarizes the stage options. In various implementations, the same stage options may be implemented in demand for a condenser fan. The first row is when the demand signal directs that the compressor 148 operate at the low stage, connecting the motor 216 to the drive 332. For the low stage, the Y1 demand signal is on, the Y2 demand signal is off, and the solenoid valve signal S is off.

The second row is when the demand signal directs that the compressor 148 operate at the mid stage, connecting the motor 216 to the incoming AC line power. For the mid stage, the Y1 demand signal is on, the Y2 demand signal is on, and the solenoid valve signal S is off.

The third row is when the demand signal directs that the compressor 148 operate at the high stage, connecting the motor 216 to the incoming AC line power. For the high stage, the Y1 demand signal is on, the Y2 demand signal is on, and the solenoid valve signal S is on.

The fourth and fifth rows are when the demand signal directs that the compressor 148 turn or remain off. In an off state, the motor 216 is connected to the AC power line but the drive 332 will maintain the motor 216 in an off state. When off, the Y1 demand signal is always off, the Y2 demand signal may be on or off, and the solenoid valve signal S is irrelevant. As mentioned previously, while control of the motor 216 using the first switch 312, the second switch 316, and the third switch 320 is described using SPDT relays, pairs of SPST relays may also be implemented.

State Diagram

Figure 5:
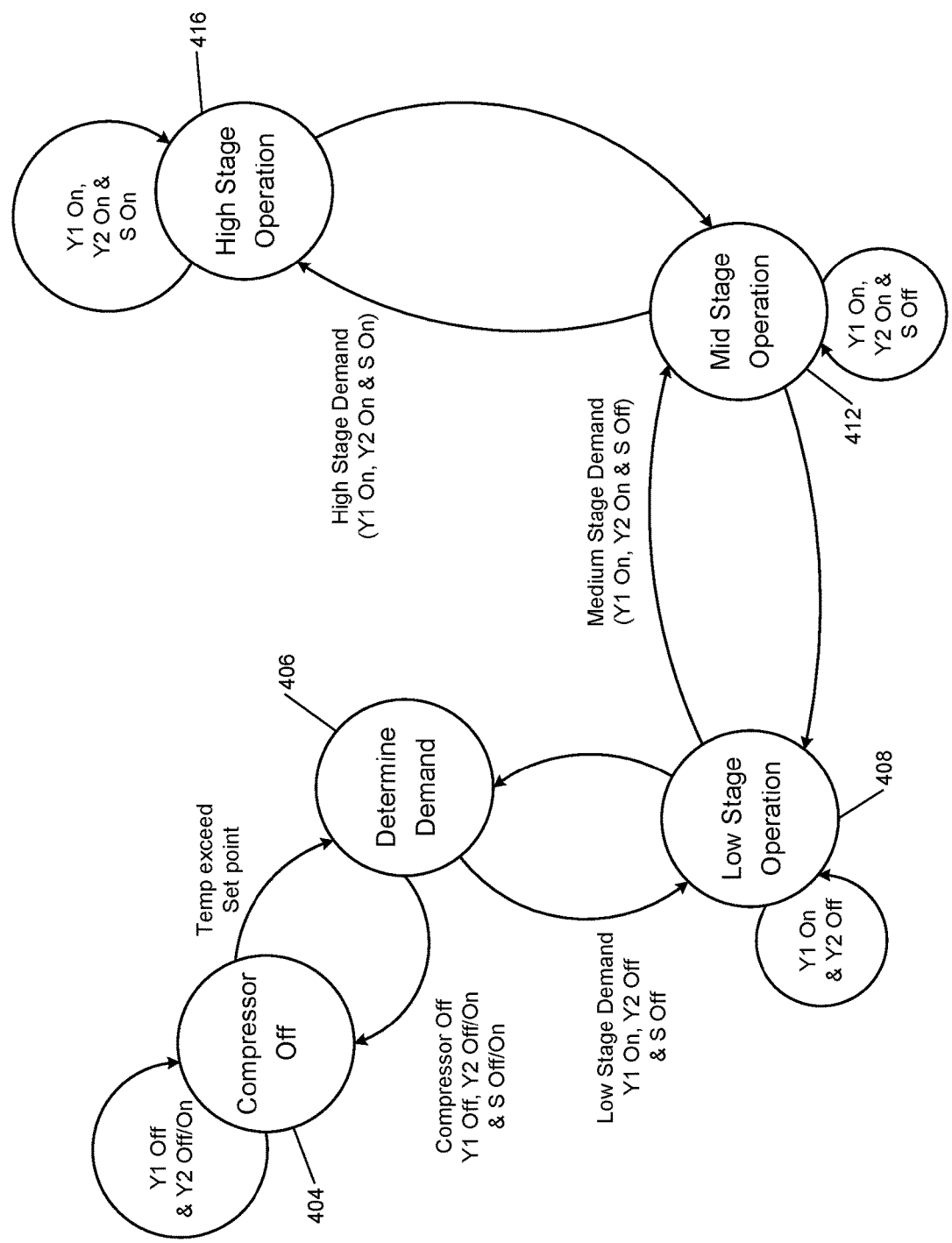
FIG. 5 is a state diagram depicting a method and control algorithm of a thermostat and an example controller according to discrete inputs.

FIG. 5 is a state diagram depicting a method and control algorithm of a thermostat and an example controller according to discrete inputs. The controller integrates a variety of features, preventing the combination of a variety of different controllers, the features including, but not limited to: reading temperature, humidity, etc.; determine the demand (as low, mid, or high); and controlling the actuation of the switches (first, second, and third). Additionally, the implementation of a single controller allows three stage operation on a main control board obviating multiple contacts and connections of high current lines.

The control algorithm shown in FIG. 5 may be executed by a combination of the thermostat 116 and the control module 156. In various implementations, the control module 112 of the air handler unit 136 may perform the functionality of the thermostat 116. The algorithm indicates operation of the compressor 148 described in FIGS. 1-4 and switches the compressor 148 between the low stage, the mid stage, and the high stage based on the demands.

In an initial state 404, the compressor 148 may be off. The thermostat may send a demand signal including Y1, Y2, and S for the compressor 148 to be off to the control module 156, for example, in response to determining a demand after an air temperature in the space to be heated or cooled by the HVAC system dropping below (in the cooling mode) or rising above (in the heating mode) a selected setpoint temperature. That is, once the indoor temperature exceeds (or falls below) the setpoint temperature, the thermostat 116 determines the demand needed to reach the setpoint temperature at state 406. As previously discussed, the demand (which stage) is determined based on OAT, humidity, and various additional parameters.

In response to determining to operate in low stage operation, the thermostat 116 transmits the demand signal to the control module 156 as Y1 on and Y2 off. In various implementations, the thermostat may also send an S off signal even though the solenoid will be in the off position if the motor is switching from off to low stage or mid stage to low stage. This combination of Y1, Y2, and S may demand low stage operation. In response to receiving the low stage demand, the control module 156 may initiate operation of the compressor 148 in the low stage at state 408. During low stage operation, the solenoid remains in the off position. Since the motor 216 is operated using PWM control signals in low stage operation, solenoid control to restrict pressurized gas is not necessary or desirable as the restriction of pressurized gas is implemented to operate the compressor 148 in full capacity.

In low stage operation at state 408, the control module 156 actuates the switches (discussed in FIG. 3) to connect the motor 216 to the drive 332. The drive 332 operates the motor 216 by implementing motor speed control of the motor 216 using, for example, PWM control. In low stage operation, the control module 156 turns or maintains the solenoid valve 220 off according to the S signal or simply by virtue of being in low stage. In various implementations, upon receiving the demand signal, the control module 156 may obtain a runtime (period) of the compressor 148 in each stage.

For example, as described in U.S. Pat. No. 9,709,311, if the OAT is above a threshold temperature (95 degrees Fahrenheit) and a previous mid stage or high stage capacity runtime is greater than a threshold (five minutes), the compressor may operate in low stage for a start threshold (five seconds) and then switch to mid stage or high stage. Otherwise, the compressor 148 may operate for a preset time (40 minutes) at the demanded stage until the demand is no longer being received (that is, the demand has been met by the setpoint temperature being reached and the compressor 148 is to be turned off).

Once in low stage operation at state 408, the compressor 148 remains in low stage operation as long as the demand signal including Y1 being on and Y2 being off is being received. If the received demand signal changes, control returns to state 406 to determine the demand. For example, if after being in state 408 in low stage operation, the setpoint temperature is reached, the thermostat 116 ends signal transmission to the control module 156. Therefore, the demand signal to the control module 156 ends and operation switches from state 408 to state 406 to determine demand. If the demand signal being received includes Y1 being off, then the thermostat 116 is directing the control module 156 to turn the compressor 148 off and operation returns to the initial state 404 where the compressor 148 is off. In the initial state 404, the control module 156 disconnects the set of switches described in FIG. 3 from L1 and L2 and connects to the drive 332 while the drive 332 maintains the motor 216 in an off state.

If at state 406 the thermostat 116 determines the demand to be mid stage operation, the thermostat 116 transmits the demand signal including Y1 being on, Y2 being on, and S being off. In response to receiving the mid stage operation demand, the control module 156 switches to low stage operation at 408 and then switches to mid stage operation shown at state 412. In mid stage operation, the control module 156 actuates the switches such that the motor 216 is directly connected to the incoming AC line voltage and actuates the solenoid valve 220 to off. Mid stage operation continues at state 412 until the demand signal no longer includes Y1 on, Y2 on, and S off. While example combinations of Y1, Y2, and S are provided, other combinations of Y1, Y2, and S may be used to indicate different demands.

If at state 406 and the thermostat 116 determines the demand to be high stage operation, the thermostat 116 transmits the demand signal including Y1 being on, Y2 being on, and S being on. In response to receiving the high stage operation demand, the control module 156 switches to low stage operation 408, then to mid stage operation at 412, and then to high stage operation shown at state 416. In high stage operation, the control module 156 actuates the switches such that the motor 216 is directly connected to the incoming AC line voltage (performed when switching to mid stage operation at 412) and actuates the solenoid valve 220 to on when switching from mid stage operation 412 to high stage operation 416. High stage operation continues at state 416 until the demand signal no longer includes Y1 on, Y2 on, and S on.

Flowchart

Figure 6:
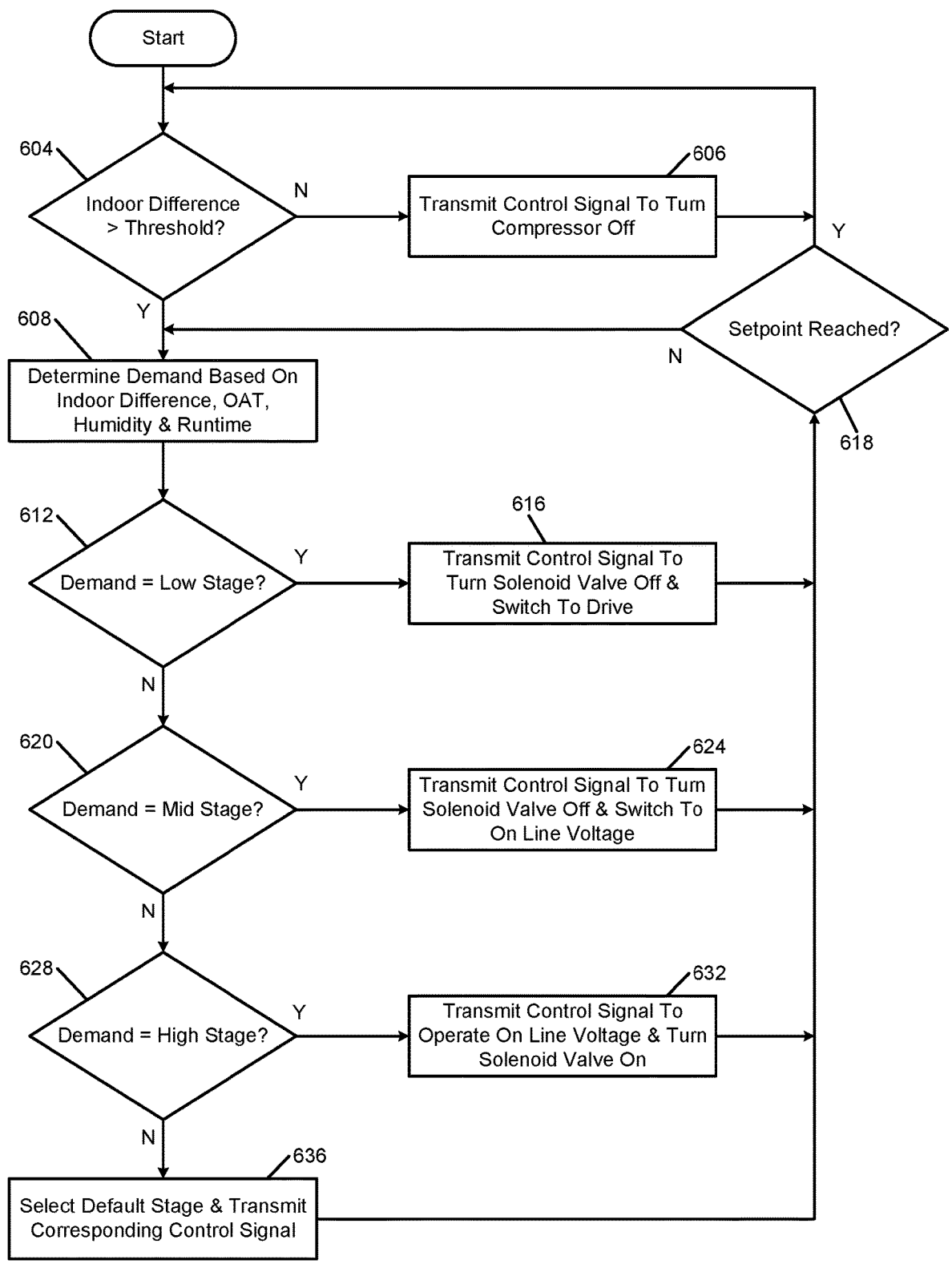
FIG. 6 is a flowchart depicting example operation of an example compressor at multiple stages using a thermostat and an example controller.

FIG. 6 is a flowchart depicting example operation of an example compressor 148 at multiple stages using a thermostat and an example controller. Control begins 604 to determine if an indoor difference (difference between an indoor temperature and a setpoint temperature) exceeds a threshold value. During heating, 604 may include determining whether the indoor temperature is less than the setpoint temperature by at least the threshold value. During cooling, 604 may include determining whether the indoor temperature is greater than the setpoint temperature by at least the threshold value. As described previously, the threshold value may be adjusted in response to user input. If no, control continues to 606 to transmit a control signal to turn the compressor 148 off. In this way, for example, the thermostat is transmitting a control signal to keep the compressor 148 off at all times since the compressor 148 is not used to adjust the indoor temperature.

In various implementations, the thermostat may only turn the compressor 148 off once and wait for the indoor difference to exceed a threshold and turn the compressor 148 on. Then, control returns to 604 to determine if the indoor difference has exceeded the threshold. Otherwise, control continues to 608 to determine a demand based on the indoor difference, OAT, humidity, and runtime. As described previously, the demand may be determined based on one or more additional parameters. In various implementations, control may adjust the operating stage based on a present runtime. For example, if low stage operation has exceeded a threshold period and the setpoint has not been reached, control may adjust the stage to mid stage or high stage operation as low stage operation did not provide effective temperature adjustment within the threshold period.

Control continues to 612 to determine if the demand is set to low stage. If yes, control proceeds to 616 to transmit a control signal to turn the solenoid valve 220 off and control the switches to connect the motor 216 to the drive 332. Then, control continues to 618 to determine if a setpoint temperature is reached. If yes, control returns to 604. In various implementations, control may instead operate the compressor 148 at the determined stage for a set amount of time. At 618, if the setpoint temperature is not reached, control returns to 608 to determine demand (for example, to adjust the demand based on the runtime of a particular stage).

Returning to 612, if the demand is not set to low stage, control proceeds to 620 to determine if the demand is set to mid stage. If yes, control continues to 624 to transmit a control signal to turn the solenoid valve 220 off and control the switches to connect the motor 216 to the line voltage (e.g., the incoming AC power). Then, control returns to 618 to determine if the setpoint temperature is reached.

Returning to 620, if the demand is not set to mid stage, control proceeds to 628 to determine if the demand is set to high stage. If yes, control continues to 632 to transmit a control signal to control the switches to connect the motor 216 to the line voltage and turn the solenoid valve 220 on. Then, control returns to 618 to determine if the setpoint temperature is reached. Returning to 628, if the demand is not set to high stage, control proceeds to 636 to select a default stage if the demand does not indicate one of the three stages and continues to 618. The default stage may be any of the low, mid, or high stages. Alternatively, at 636, control may generate and transmit an error or fault message as the demand is not indicated or not compatible with the stages and returns to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, VHDL, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for controlling a capacity of a compressor, comprising:
   a motor of the compressor including a main winding connected at a connection point to an auxiliary winding;
   a drive configured to control a speed of the motor;
   a first switch configured to selectively connect the main winding to either (a) a first line voltage or (b) a first output of the drive;
   a second switch configured to selectively connect the connection point to either (a) a second line voltage or (b) a second output of the drive;
   a third switch configured to selectively connect the auxiliary winding to either (a) a capacitor or (b) a third output of the drive;
   a solenoid valve configured to selectively either operate in (a) a first capacity or (b) a second capacity; and
   a control module configured to control the drive, the first switch, the second switch, and the third switch by:
      in response to receiving a demand in a first state:
         switching the first switch to connect the main winding to the first output of the drive;
         switching the second switch to connect the connection point to the second output of the drive;
         switching the third switch to connect the auxiliary winding to the third output of the drive; and
         switching the solenoid valve to the first capacity;
      in response to receiving the demand in a second state:
         switching the first switch to connect the main winding to the first line voltage;
         switching the second switch to connect the connection point to the second line voltage;
         switching the third switch to connect the auxiliary winding to the capacitor; and
         maintaining the solenoid valve at the first capacity; and
      in response to receiving the demand in a third state:
         switching the first switch to connect the main winding to the first line voltage;
         switching the second switch to connect the connection point to the second line voltage;
         switching the third switch to connect the auxiliary winding to the capacitor; and
         switching the solenoid valve to the second capacity.

2. The system of claim 1 wherein:
   the control module, the first switch, the second switch, and the third switch are integrated in a control board.

3. The system of claim 1 wherein:
   when the solenoid valve is in the first capacity, the solenoid valve is configured to allow a flow of pressurized gas, and
   when the solenoid valve is in the second capacity, the solenoid valve is configured to selectively restrict the flow of the pressurized gas.

4. The system of claim 1 wherein the compressor is a two-stage compressor.

5. The system of claim 1 wherein the main winding includes a first side and a second side, wherein the auxiliary winding includes a first side and a second side, and wherein the connection point connects the second side of the main winding and the first side of the auxiliary winding.

6. The system of claim 1 wherein the demand is set to:
   the second state in response to a first runtime of the first state exceeding a first runtime threshold, and
   the third state in response to a second runtime of the second state exceeding a second runtime threshold.

7. The system of claim 1 further comprising a thermostat and an outside air temperature sensor, wherein the thermostat is configured to:
   set the demand based on at least one of (i) an inside air temperature and (ii) an outside air temperature, wherein the inside air temperature is determined by the thermostat, and wherein the outside air temperature is received from the outside air temperature sensor, and
   transmit the demand to the control module.

8. The system of claim 7 wherein the demand is set to:
   during cooling:
      the first state when the inside air temperature is above a first threshold and below a second threshold,
      the second state when the inside air temperature is above the second threshold and below a third threshold, and
      the third state when the inside air temperature is above the third threshold, and
   during heating:
      the first state when the inside air temperature is below the first threshold and above a fourth threshold, the second state when the inside air temperature is below the fourth threshold and above a fifth threshold, and the third state when the inside air temperature is below the fifth threshold.

9. The system of claim 7 wherein the demand is set to:

during cooling:
the first state when the outside air temperature is above a first threshold and below a second threshold, the second state when the outside air temperature is above the second threshold and below a third threshold, and the third state when the outside air temperature is above the third threshold, and during heating:
the first state when the outside air temperature is below the first threshold and above a fourth threshold, the second state when the outside air temperature is below the fourth threshold and above a fifth threshold, and the third state when the outside air temperature is below the fifth threshold.

10. The system of claim 7 further comprising a relative humidity sensor, wherein the thermostat is configured to:
receive a relative humidity from the relative humidity sensor,
set the demand further based on the relative humidity, and
transmit the demand to the control module.

11. The system of claim 1 wherein the first line voltage and the second line voltage are received from an incoming AC power line.

12. The system of claim 1 wherein the drive is configured to selectively adjust the speed of the motor using pulse width modulation control.

13. The system of claim 1 wherein the capacitor includes a first side and a second side, wherein the first side of the capacitor is connected to the third switch, and wherein the second side of the capacitor is connected to the first line voltage.

14. A heating, ventilation, and/or air conditioning (HVAC) system comprising:
the system for controlling the capacity of the compressor of claim 1.

* * * * *